United States Patent
Burrow et al.

(10) Patent No.: US 10,224,129 B2
(45) Date of Patent: Mar. 5, 2019

(54) MANUFACTURING A CONDUCTOR PART

(71) Applicants: Christopher Burrow, Ulverston (GB); Paul Chana, Wrexham (GB); Trevor Jones, Kendal (GB); Christopher Plant, Lancaster (GB)

(72) Inventors: Christopher Burrow, Ulverston (GB); Paul Chana, Wrexham (GB); Trevor Jones, Kendal (GB); Christopher Plant, Lancaster (GB)

(73) Assignee: Siemens Aktiengesellschaft, München (DE)

( * ) Notice: Subject to any disclaimer, the term of this patent is extended or adjusted under 35 U.S.C. 154(b) by 129 days.

(21) Appl. No.: 15/489,307

(22) Filed: Apr. 17, 2017

(65) Prior Publication Data

US 2017/0221605 A1 Aug. 3, 2017

Related U.S. Application Data

(62) Division of application No. 14/498,953, filed on Sep. 26, 2014, now Pat. No. 9,659,684.

(30) Foreign Application Priority Data

Sep. 27, 2013 (EP) .................................... 13186407

(51) Int. Cl.
*H01R 43/00* (2006.01)
*H01B 7/17* (2006.01)
*H02G 15/10* (2006.01)
(Continued)

(52) U.S. Cl.
CPC ............. *H01B 7/17* (2013.01); *H01B 7/0009* (2013.01); *H01B 7/02* (2013.01); *H01B 13/062* (2013.01);
(Continued)

(58) Field of Classification Search
CPC .......... H01B 7/17; H01B 13/062; H01B 7/02; H01B 7/0009; H01R 43/005;
(Continued)

(56) References Cited

U.S. PATENT DOCUMENTS 4,304,616 A * 12/1981 Richardson ......... B29C 61/0616
156/86
7,794,254 B2 9/2010 Marklove et al.
(Continued)

FOREIGN PATENT DOCUMENTS

EP 2197080 A1 6/2010
EP 1870975 B1 8/2010
(Continued)

OTHER PUBLICATIONS

Australian Examination Report for related Australian Application No. 2014208281, dated Mar. 16, 2018.
(Continued)

*Primary Examiner* — Donghai D Nguyen
(74) *Attorney, Agent, or Firm* — Lempia Summerfield Katz LLC (57) ABSTRACT

A method for manufacturing a conductor part for a connector unit is provided. The conductor part includes a conductive core, an insulating sleeve, and at least a first conductive layer arranged between the conductive core and the insulating sleeve. The method includes equipping at least one section of a radially inner surface of the insulating sleeve with the first conductive layer, and equipping at least one section of a radially outer surface of the insulating sleeve with at least a second conductive layer. The second conductive layer is a metal layer or a conductive plastic layer. The method also includes inserting the conducting core in the insulating sleeve before or after equipping a surface of the insulating sleeve with a conductive layer.

8 Claims, 3 Drawing Sheets

(51) Int. Cl.
*H02G 15/184* (2006.01)
*H01B 7/00* (2006.01)
*H01B 7/02* (2006.01)
*H01B 13/06* (2006.01)
*H01R 13/523* (2006.01)

(52) U.S. Cl.
CPC ......... *H01R 13/523* (2013.01); *H01R 43/005* (2013.01); *H02G 15/10* (2013.01); *H02G 15/184* (2013.01); *Y10T 29/49117* (2015.01)

(58) Field of Classification Search
CPC .... H01R 13/523; H02G 15/184; H02G 15/10; H02G 15/1806; Y10T 29/49117; Y10T 29/49195
USPC .................................................. 29/825, 868
See application file for complete search history.

(56) References Cited

U.S. PATENT DOCUMENTS

| | | | |
|---|---|---|---|
| 7,959,454 B2 | 6/2011 | Ramasubramanian et al. | |
| 8,578,602 B2 * | 11/2013 | Christen | H02G 15/1806 29/858 |
| 9,287,658 B2 | 3/2016 | Lewin | |
| 9,343,846 B2 | 5/2016 | Burrow et al. | |
| 2003/0134538 A1 | 7/2003 | Bolcar | |
| 2004/0209025 A1 * | 10/2004 | Kobayashi | B32B 1/08 428/34.9 |
| 2011/0034066 A1 | 2/2011 | Jazowski et al. | |
| 2016/0204546 A1 | 7/2016 | Lewin | |

FOREIGN PATENT DOCUMENTS

| | | |
|---|---|---|
| GB | 1177915 A | 1/1970 |
| WO | WO9416485 A1 | 7/1994 |

OTHER PUBLICATIONS

European Search Report for Application No. 13186407.6, dated Feb. 12, 2014.
European Search Report for Application No. 14178260.7, dated Feb. 12, 2015, with English Translation.

\* cited by examiner

MANUFACTURING A CONDUCTOR PART

This application is a divisional application of U.S. application Ser. No. 14/498,953, filed on Sep. 26, 2014, now U.S. Pat. No. 9,659,684, which claims the benefit of EP 13186407.6, filed on Sep. 27, 2013. These documents are hereby incorporated by reference in their entirety.

FIELD

The present embodiments relate to manufacturing a conductor part and to the conductor part.

BACKGROUND

Demands of communication over wide distances (e.g., between continents) will increase. Hence, infrastructures (e.g., sea cables and connectors linking sea cables and modules such as subsea modules, like transformers, pumps etc.) that are located and operated error proof subsea will be used. Partial discharge at higher AC voltages between a conductor and an insulator in typical connectors and penetrators is a long term reliability problem. In a connector/penetrator, the insulation may be formed by over moulding the conductor or assembling an insulator sleeve or layer over the conductor. In these methods, it is either not possible and/or not easy and requires careful design of the process and a conductive core to completely eliminate the air void between conductor and insulator. The air void is a source for partial discharge phenomenon. For example, there is a gap between the conductor and insulator when a pre-formed sleeve is engaged over the conductor. There is also difficulty in over moulding a polymer insulation onto a metal substrate and achieving a consistently bonded interface. Typically, air voids are formed at the interface due to shrinkage of the polymer during processing and coefficient of thermal expansion differences between the materials. Since air is a poor insulator when compared with typical high voltage insulations, the electrical potential (e.g., voltage) will over-stress these air voids. As the air ionizes, the result is partial discharges. The resulting damage will eventually lead to a dielectric failure of the insulation.

It is, for example, known to directly mould a conductor pin insulation onto a conductive core. This is, for example, possible with Epoxy. These moulded pins may then be plated to provide an outer conductive layer in close contact with the insulation.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for manufacturing a conductor part for a connector unit that provides an electrically unstressed interface between insulating parts and electrical components of the conductor part is provided. Consequently, the conductor part may be reliable and less insusceptible to errors in comparison to state of the art systems.

As another example, a conductor part that is failure proof and reliable is provided.

In one embodiment, a method for manufacturing a conductor part for a connector unit (e.g., for use in a subsea application) where the conductor part includes a conductive core, an insulating sleeve, and at least a first conductive layer arranged between the conductive core and the insulating sleeve, is provided.

The method includes equipping at least one section of a radially inner surface of an insulating sleeve with a first conductive layer and equipping at least one section of a radially outer surface of the insulating sleeve with at least a second conductive layer. The second conductive layer is at least one layer and is a metal layer, a conductive plastic layer, or a combination thereof. The method also includes inserting a conducting core in the insulating sleeve before or after equipping a surface of the insulating sleeve with a conductive layer. The equipping acts may be reversed.

An interface between the insulating sleeve of the conductor part and either the high voltage or earth with close contact between the insulating sleeve of the conductor part and either the high voltage or earth is provided. Thus, the interface is free of air entrapment or contamination, is void free or air tight, which may have lower breakdown strength than the insulation. Hence, a risk for partial discharge is minimized, providing a reliable conductor part. By using the method of one or more of the present embodiments, the insulation of the conductor part may be placed under greater electrical stress in comparison with state of the art systems. The method also has advantages in terms of preventing the stress diverging into places where the stress may have detrimental effects. Thus, electrical stress is no longer a consideration during the design of current carrying components. Since an interface between the current carrying components and the first/second conductive layer on the inside of the insulating sleeve/shell is under no electrical stress, conductive parts (e.g., the conductive core) may have any shape suitable for a person skilled in the art. Hence, a system with less electrical issues, compared with state of the art systems, may advantageously be provided. By using a selected metal layer or a conductive plastic layer, a corrosion resistance may be provided, which is beneficial in a wet environment.

Even if the terms "conductive layer," "section," "metal layer," "plastic layer," "radial space," "mediator layer," and "connected part" (see also below) are used in the singular or in a specific numeral form, the embodiment is not restricted to the singular or the specific numeral form. More than one or a plurality of the above mentioned structure(s) may be provided.

A connector provides a unit that physically connects at least two parts (e.g., two cables, subsea cables, or a cable with a subsea module such as a transformer, a pump, etc. or a busbar inside of the module or two modules, respectively). Thus, a subsea connector unit may be provided. The connector unit may be used in any harsh environment and may be embodied as an electrical connector and/or penetrator or, for example, as a wet mateable connector/penetrator. The connector unit may be employed in a high voltage application.

Such a connector unit includes at least a conductor part that helps to establish an electrical connection in a mated position of two connected parts (e.g., two cables or a cable with a module). The conductor part may be a conductor pin, receptacle pin or male part of a connector or of a penetrator or a socket contact of a female part, plug or socket or connector body of a connector for contacting a conductor pin of a male part. The female socket may be a part of the connector unit with an opening, recess or bore to receive another part of the connector unit, like the conductor pin or parts thereof. In an embodiment of the connector unit including a penetrator, the conductor pin is permanently connected to a cable or a module via a housing. Thus, the conductor pin may be a part of the unit with a pin, extension or the like to engage or being inserted in the opening of the female socket, the cable, or the module. The conductor pin and a corresponding part (e.g., female socket, cable or module) may establish an electrical connection either in case of mating of the male and female parts or a permanent connection of the conductor pin with the cable or module. The female and male parts or the module each may be encased in a casing or an external of a cable.

The insulating sleeve may be a cylindrical tube that may have a homogenous, a stepped or a tapered inner and/or outer contour. The inner and/or outer surfaces of the sleeve may be skin surfaces or parts thereof. The term "equipping" may be "providing and/or fitting". For the equipping, any number of methods including, for example, plating, spraying, vapor deposition, and sputtering may be used. The wording "equipping at least one section of a surface of the insulating sleeve" may be that the surface is at least partially equipped with a conductive layer. The section has, for example, a homogenous or uniform contour, like a homogenous diameter. The wording "before or after equipping the outer surface with the second conductive layer" may be that the sequence of the last two acts may be reversed.

The second equipping is, for example, a plating of the metal layer of the second conductive layer onto the section of the outer surface of the insulating sleeve. Thus, the intimate (e.g., close) interface between the insulation and the conductive layer may be provided constructively easy and reliably. In one embodiment, the second equipping is a chemical plating process. According to an alternative embodiment, the second equipping is a spraying of the second conductive layer onto the section of the outer surface of the insulating sleeve. Hence, a corrosion resistance layer may be applied homogeneously and quick. In one embodiment, the second equipping is a plasma spray depositing process.

The first equipping step may be a plating (e.g., a chemical plating process) of the first conductive layer on the section of the inner surface of the sleeve. Consequently, the conductive layer may be applied with good results. In an alternative embodiment, the first equipping is a spraying (e.g., a plasma spray depositing process) of the first conductive layer onto the section of the inner surface of the insulating sleeve. As a result, a corrosion resistance layer may be applied homogeneously and quick. Moreover, the first conductive layer is at least one layer and is a metal layer, a conductive plastic layer, or a combination thereof. Hence, materials with good conductive properties may be deployed.

In one embodiment, the method further includes filling at least a radial space between the conductive core and the first conductive layer at the inner surface of the insulating sleeve with at least a mediator layer and/or a mediator material. By selecting a suitable mediator, mediator layer or mediator material, characteristics of an interaction between the conductive core and the first conductive layer may be selectively chosen.

In one embodiment, the mediator layer has a thermally and/or electrically conductive property. Thus, an intimate interface between the conductive core and the first conductive layer or the metal/conductive plastic layer, respectively, may be omitted. In other words, the conductive core may not be in close contact with the first conductive layer or the metal/conductive plastic layer, respectively. A sufficient contact between the conductive core and the first conductive layer may be established if the mediator layer has a material that is a grease or an adhesive. This may, for example, be silicones, like ACC Silicones SG500 or Sylgard 170.

For example, the mediator layer may be a combination of a mediator (e.g., assembly) and a mediator material, where one of the mediator and the mediator material provides a thermal interface, and the other mediator and the mediator material provides the electrical interface. The thermal interface is provided by a thermally conductive mediator material (e.g., a grease or an adhesive). This thermally conductive mediator material is an alternative feature because the thermally conductive mediator material is not required for the electrical performance and provides thermal conduction and mechanical support to the insulator. A spring loaded contact, like a spring loaded plunger (e.g., metal cap with a spring behind the metal cap), is provided to mediate the electrical connection between the core and the conductive layer and represents a mediator (e.g., assembly). By using a spring for the electrical contact, inhomogeneous thermal expansion and shrinking of pieces out of different materials may be compensated easily. In one embodiment, a mediator layer having both electrically and thermally conductive properties may be provided. This may save mounting efforts and costs.

According to an alternative embodiment of the method, the first equipping is a connecting of the first conductive layer to the section of the inner surface of the insulating sleeve by an interference fit and/or interference fit tubing. Hence, a tight and secure connection may be provided. The interference fit may be established by any number of methods including, for example, application of force and/or of thermal expansion or contraction. Force may be applied by pushing a tube out of a conductive material or provided with a conductive layer at an inner surface into an inner diameter of the insulating sleeve, where the inner diameter of the insulating sleeve is only slightly wider than an outer diameter of the inserted tube (e.g., conductive). Thus, the interference fit is a press fit in this case.

In one embodiment, the method includes at least the following pre-steps. The method includes heating the insulating sleeve so that at least the inner diameter of the insulating sleeve expands. The method also includes inserting a tube out of a conductive material or at least with a layer out of a conductive material at an inner surface, into the expanded diameter of the insulating sleeve. The method includes connecting the insulating sleeve to the tube by cooling down the heated insulating sleeve, thus providing a fixed connection between the tube and the insulating sleeve. The tube represents the first conductive layer. As a result, an especially secure and intimate contact between the insulating sleeve and the first conducting layer and/or a tight fit of the insulating sleeve onto the conductive layer (e.g., tube) may be established. The insulating sleeve may be heated up to a temperature of about 140° C. or to a temperature of about 120° C.

The pre-steps provide a heat-shrinking of the insulating sleeve on the tube out of conductive material. The tube out of conductive material (e.g., a conductive tube) is, during the insertion into the insulating sleeve, for example, colder than the heated insulating sleeve or cold and unheated and may have approximately room temperature (e.g., approximately 20° C.). An even tighter fit between the insulating sleeve and the first conductive layer/tube may be provided when the inner tube is cooled in a pre-cooling before the insertion of the tube into the heated sleeve. The tube may be cooled down to a temperature of about −40° C. or higher. The tube has, before and after the heat shrinking and the optional pre-cooling, basically the same diameter. In the scope of a diameter as "basically the same," there is a divergence of the diameter before shrinking and the diameter after shrinking of about 10%. In one embodiment, the diameter before shrinking and the diameter after shrinking are the same. The term "fixed connection" may be an intimate (e.g., close), void free and/or air free connection or interface. Further, "represent" may be understood as "provide, is or function as".

According to a further and alternative method, the method may omit the second equipping (e.g., equipping the at least one section of a radially outer surface of the insulating sleeve with at least a second conductive layer, where the second conductive layer is at least one metal layer). This method sequence may further include inserting the conducting core in the insulating sleeve.

In a further embodiment, the method further includes providing at least a second section of the radially inner surface of the insulating sleeve with at least one further conductive layer, where the further conductive layer may be a metal layer. For example, sections with contours that differ from a contour of the first section of the insulating sleeve may thus also be provided with a suitable interface to the insulating sleeve. An acceptable and sufficient electrical interface with tapers or square shoulders that interface with the copper core pin at each end of the first section of the inner surface of the insulating sleeve may be provided. The metal layer may be plated, or the conductive layer may be applied by spray deposition onto the further section of the inner surface of the insulating sleeve. The further conductive layer may also be a conductive plastic layer.

According to a further aspect, a conductor part of a connector unit, for connecting at least two connected parts, like a cable or module (e.g., a subsea cable or module), fabricated according to the method of one or more of the present embodiments is presented. As stated above, the conductor part includes the conductive core, the insulating sleeve and at least the first conductive layer arranged between the conductive core and the insulating sleeve. The first conductive layer is arranged at at least one section of the inner surface of the insulating sleeve. The conductor part includes at least a second conductive layer arranged at at least one section of the outer surface of the insulating sleeve. The second conductive layer is at least one layer and is a metal layer, a conductive plastic layer, or a combination thereof.

An interface between the insulating sleeve of the conductor part and either the high voltage or earth is provided, and the insulating sleeve of the conductor part and either the high voltage or earth are in intimate (e.g., close) contact with each other. Thus, the interface is free of air entrapment or contamination, is void free, and/or is air tight. The interface may have a lower breakdown strength than the insulation. Hence, a risk for partial discharge is minimized, providing a reliable conductor part. By using the method of one or more of the present embodiments, the insulation of the conductor part may be placed under greater electrical stress in comparison with state of the art systems. The method also has advantages in terms of preventing the stress diverging into places where the stress may have detrimental effects. Thus, electrical stress is no longer a consideration during the design of current carrying components. Since an interface between the current carrying components and the first/second conductive layer on the inside of the insulating sleeve/shell is under no electrical stress, conductive parts (e.g., the conductive core) may have any number of shapes. Hence, a system with less electrical issues, compared with state of the art systems, may advantageously be provided.

By using a selected metal layer or a conductive plastic layer, a corrosion resistance may be provided. This is beneficial in a wet environment.

The wording that the conductive layer "is arranged at" at least one section of an inner/outer surface may be understood as "is connected to and/or built with."

In one embodiment, the first conductive layer is a metal layer and/or a conductive plastic layer. Thus, a material with good conductive properties may be used.

In an alternative embodiment, the first conductive layer has the same base material as the insulating sleeve. Hence, a connection between the first conductive layer and the insulating sleeve will be easy and may provide a good electrical interface. In this context, a base material may be a material that is the main component of the part. The material may define a main property or function of a part, like an isolating function, or the material may provide an auxiliary function, like a moulding, stabilizing or handling function. This function may be different for the insulating sleeve and the conductive layer. The base material may be any number of materials including, for example, a plastic material (e.g., out of the polyaryletherketone (PAEK) family, Epoxy family or the polyamide family such as Nylon).

Alternatively, an insulating sleeve and a first conductive layer with different base materials but with thermally compatible materials may be used. These materials may be two plastic materials (e.g., PEEK and Nylon).

In one embodiment, the first conductive layer is a layer of a polymer material or a thermoset polymer material. The polymer material may be any number of materials including, for example, an engineering plastic, or a material out of the PAEK family, Epoxy family or polyamide family (e.g., polyether ether ketone (PEEK)). Thermoset polymer material may be any number of materials including, for example, an epoxy material or the like. In one embodiment, the insulating sleeve is fabricated out of insulative PEEK, and the first conductive layer is fabricated out of conductive PEEK. Conductive PEEK is, for example, loaded with carbon nanotubes or carbon fiber filler until the resistance of the PEEK reduced to a needed amount.

In one embodiment, the radially inner surface of the insulating sleeve includes at least a second section, where the second section includes at least one further conductive layer. The further conductive layer may be a metal layer. In other words, the second section may be metal plated. Hence, for example, sections with contours that differ from a contour of the first section of the insulating sleeve may also be provided with a suitable interface to the insulating sleeve. An acceptable and sufficient electrical interface (e.g., with a taper or a square shoulder at each end of the first section of the inner surface of the insulating sleeve) may be provided.

An effective conductive layer and thus connection to the insulating sleeve may be provided when the first and the second conductive layers have, for example, a thickness between 1 micrometer ($\mu$m) and 20 millimeter (mm), between 5 $\mu$m and 15 mm, or between 10 $\mu$m and 10 mm. The following ranges may be beneficial for the conductive properties of the first and the second conductive layers. In case of a metal layer, the first and the second conductive layers have, for example, a thickness between 1 $\mu$m and 40 $\mu$m, between 5 $\mu$m and 35 $\mu$m, or between 10 $\mu$m and 30 $\mu$m. Further, in case of a conductive plastic layer, the first and the second conductive layers have, for example, a thickness between 1 mm and 20 mm, between 1.5 mm and 10 mm, or between 2 mm and 5 mm.

According to a further aspect, the metal layer includes copper, a copper alloy, aluminum, a nickel-cobalt ferrous alloy (e.g., Kovar®), molybdenum, titanium and/or nickel (e.g., phosphorous nickel). Thus, a material with convincing and well-proven properties may be used. The metal layer may be arranged on a base layer (e.g., high phosphorous nickel on top of a copper base layer). Thus, the metal layer may include more than one layer. In one embodiment, the metal layer includes titanium or nickel (e.g., phosphorous nickel). The nickel is disposed on a base layer out of copper. By using, for example, titanium, a desired corrosion resistance may be provided.

In an embodiment, the conductive core (e.g., a solid core) has a material including metal such as copper, a copper alloy, aluminum, a nickel-cobalt ferrous alloy (e.g. Kovar®), and/or molybdenum. Hence, the usage of a reliable material is provided.

By using the method of one or more of the present embodiments or that metal plating, interference fit tubing or a combination of both may be used, the same advantages as a triple extrusion or over-moulding may be achieved.

The above-described characteristics, features and advantages and the manner in which the characteristics, features and advantages are achieved are clear and clearly understood in connection with the following description of exemplary embodiments explained in connection with the drawings.

DETAILED DESCRIPTION

In different figures, similar or identical elements are provided with the same reference signs.

Figure 1:
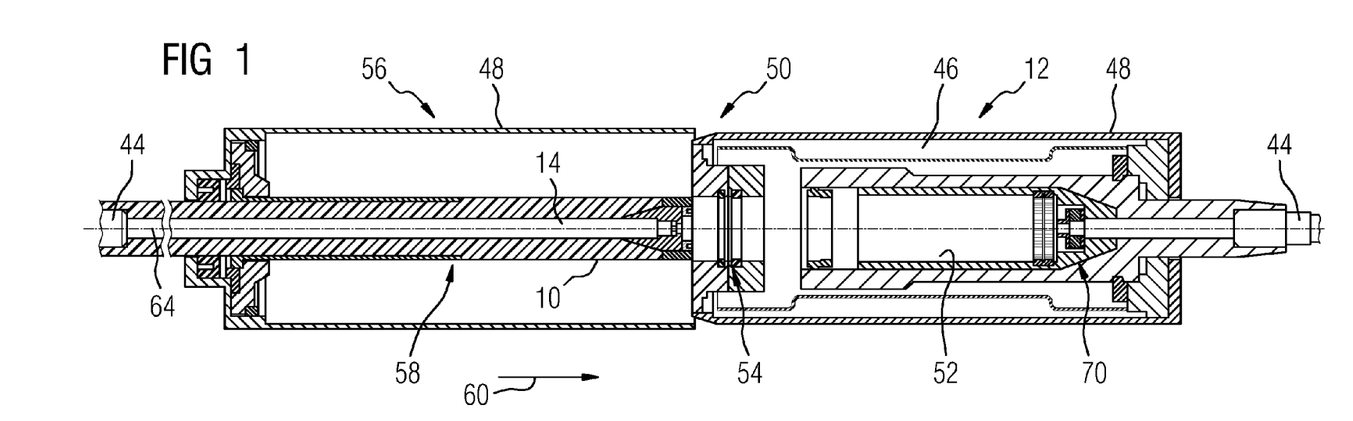
FIG. 1 shows a subsea connector unit with one embodiment of a conductor pin and a female socket before mating.

FIG. 1 shows one embodiment of a high voltage subsea connector unit 12 for connecting two connected parts 44 (e.g., two subsea cables 44). The connector unit 12 includes a conductor part 10 or conductor pin/male part and a female socket 46 or part (of the cables 44, only connecting regions are illustrated). The conductor part/pin 10 and the female socket 46 are each encased in a housing 48 that is axially aligned during a mating or demating process of the conductor part/pin 10 and female socket 46. The female socket 46 is located at a plug front end 50 of one subsea cable 44 and includes an axially extending bore 52 with seals 54 for preventing entering of dirt into internals of the female socket 46. The conductor part/pin 10 is located at a receptacle front end 56 of the other subsea cable 44 and includes a receptacle pin assembly 58.

Figure 2:
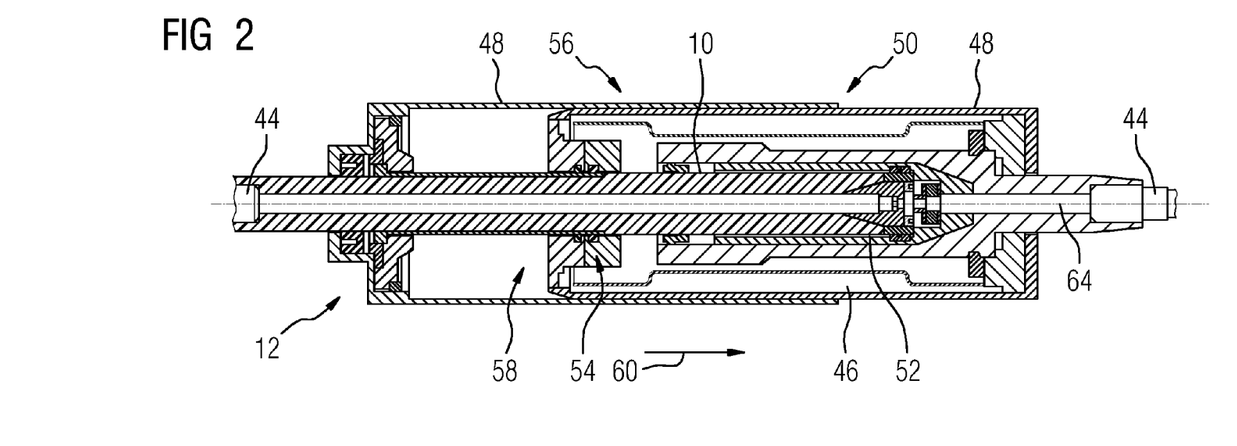
FIG. 2 shows the subsea connector unit from FIG. 1 in a mated position.

For a mating of the conductor part/pin 10 and female socket 46, the bore 52 and the receptacle pin assembly 58 are arranged axially aligned towards each other, so that by moving the receptacle pin assembly 58 in direction of the female socket 46 or the moving direction 60, the receptacle pin assembly 58 may partially enter the bore 52 of the female socket 46. Due to a proper positioning of the receptacle pin assembly 58 in the bore 52 of the female socket 46, an electrical connection is established between the conductor part/pin 10 and a socket contact 70. This mating position is schematically shown in FIG. 2.

Figure 3:
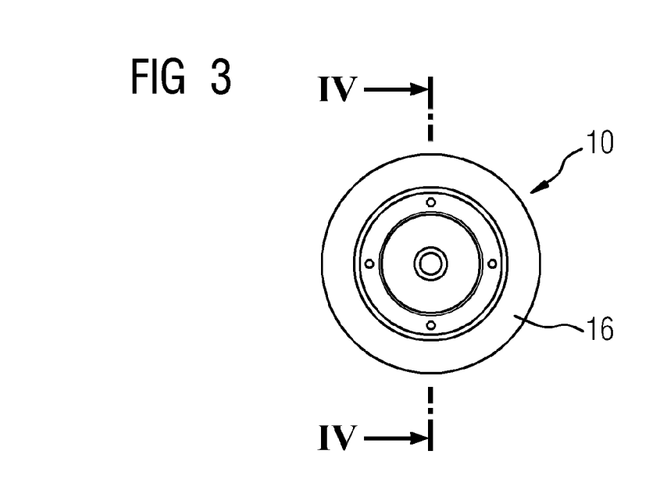
FIG. 3 shows a front view of the conductor pin of FIG. 1.
Figure 4:
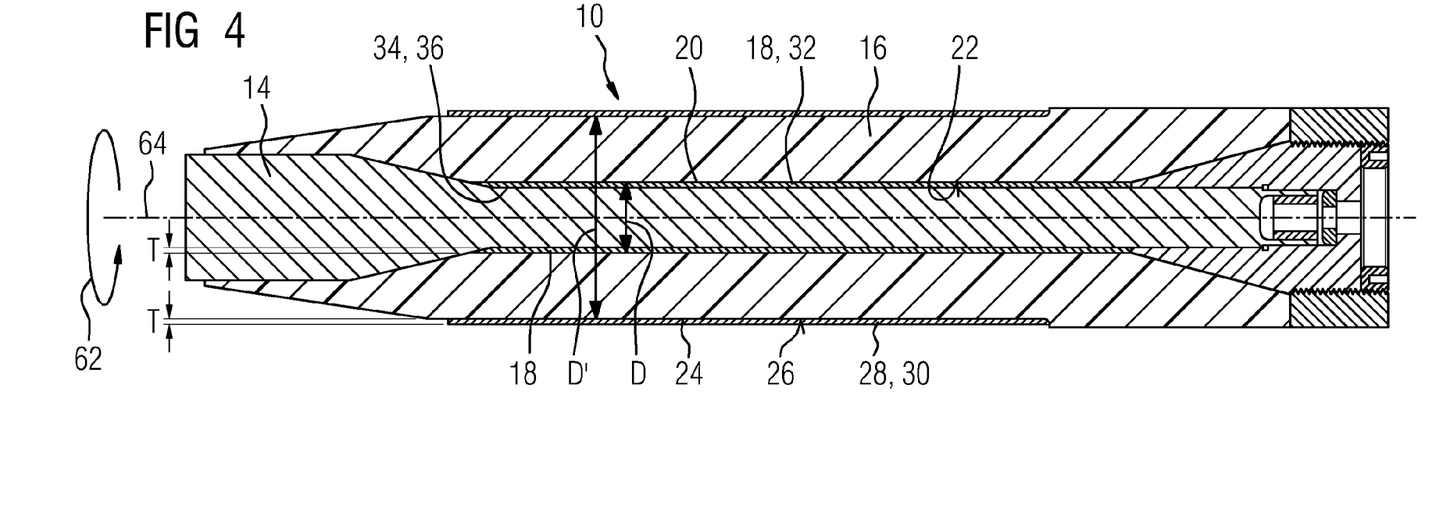
FIG. 4 shows a section along line IV-IV through the illustration of the conductor pin of FIG. 3.

FIG. 3 shows a front view of one embodiment of the conductor part/pin 10 in the form of a male conductor pin, and FIG. 4 shows a section along line IV-IV in FIG. 3. The conductor part/pin 10 includes a conductive core 14 out of, for example, copper and an insulating sleeve 16 out of, for example, insulative polyether ether ketone (PEEK). A different PAEK or glass filled PEEK may be used. The insulating sleeve 16 is arranged in circumferential direction 62 around the conductive core 14. Arranged between the conductive core 14 and the insulating sleeve 16, the conductor part 10 also includes a first conductive layer 18.

This first conductive layer 18 is arranged at a section 20 of an inner surface 22 of the insulating sleeve 16. The section 20 is a portion of the insulating sleeve 16 having a homogeneous inner diameter D. The inner surface 22 is a skin surface of the sleeve 16 that extends parallel to an axis 64 of the conductive core 14. The conductive layer 18 is a metal layer 32 out of, for example, titanium or high phosphorous nickel on top of a copper base layer. A conductive plastic layer may also be provided as conductive layer 18 (not shown).

A radial space 34 between the conductive core 14 and the first conductor layer 18 at the inner surface 22 is filled with a mediator layer 36. The mediator layer 36 includes, for example, a thermally conductive mediator material (e.g., a grease or an adhesive such as Sylgard 170) to provide thermal conduction and mechanical support to the insulating sleeve 16. An electrical interface between the conductive core 14 and the first conductive layer 18 is provided by mediator assembly in the form of a spring loaded contact, like a spring loaded plunger (e.g., metal cap with a spring behind the metal cap; not shown in detail).

The conductor part/pin 10 includes a second conductive layer 28 that is arranged at a section 24 of an outer surface 26 of the insulating sleeve 16. The section 24 is a portion of the insulating sleeve 16 having a homogeneous outer diameter D', where the inner surface 24 is a skin surface of the sleeve 16 that extends parallel to the axis 64 of the conductive core 14 and to the inner surface 22. The conductive layer 28 is also a metal layer 30 out of, for example, titanium or high phosphorous nickel on top of a copper base layer.

Both conductive layers 18, 28 or metal layers 30, 32, respectively, have, for example, a thickness T between 1 µm to 30 µm (e.g., about 25 µm). A conductive plastic layer would have a thickness of about 2 mm to 5 mm, for example (not shown).

A manufacturing sequence of the conductor part 10 starts with a piece of machined tube-shaped PEEK as the insulating sleeve 16.

The method includes equipping, by metal plating, a section 20 of the radially inner surface 22 of the insulating sleeve 16 with the first conductive copper layer 18. The section 24 of the radially outer surface 26 of the insulating sleeve 16 is equipped by metal plating with the second conductive copper layer 28. In other embodiments, a conductive layer may be provided by spray coating for both conductive layers 18, 28 or a conductive plastic layer by vapor deposition for the outer conductive layer 28 (not shown). The conducting core 14 is inserted in the insulating sleeve 16. The radial space 34 between the conductive core 14 and the first conductive layer 18 at the inner surface 22 is filled with the mediator layer 36 with thermally and electrically conductive properties to provide an interface between the core 14 and layer 18. Since close contact between the conductive core 14 and the first conductive layer 18 is unnecessary, the core 14 may be mechanically "rough" or may not have a specially selected and/or machined shape.

Alternatively, the sequence may start with the metal plating or spray coating of the outer surface 26 of the insulating sleeve 16 followed by the metal plating or spray coating of the inner surface 22 of the insulting sleeve 16. The conductive core 14 may also be inserted after the plating or spray coating of the inner surface 22 and before the plating of the outer surface 26.

Figure 5:
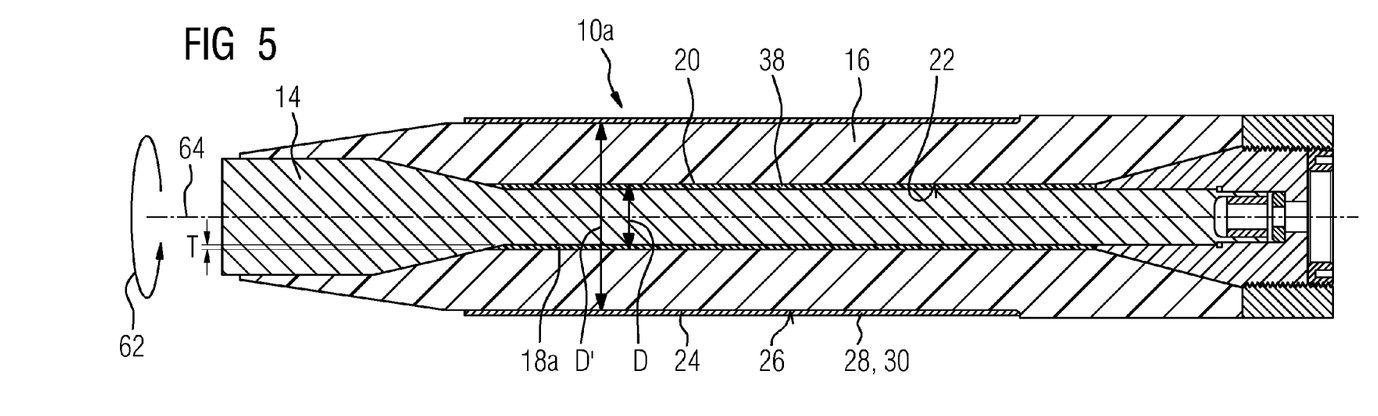
FIG. 5 shows a section through a first alternative embodiment of the conductor pin.
Figure 6:
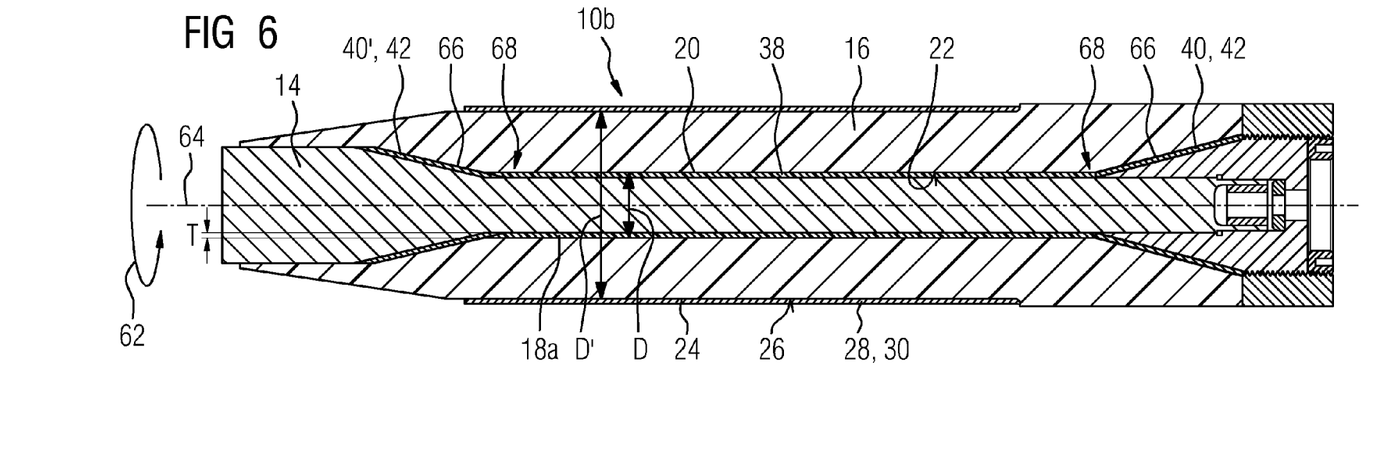
FIG. 6 shows a section through a second alternative embodiment of the conductor pin.

FIGS. 5 and 6 show two alternative exemplary embodiments of the conductor part/pin 10. Same components, features and functions are denoted by the same reference numerals. However, to distinguish the exemplary embodiments of FIGS. 5 and 6 over that of FIGS. 1 to 4, the letters 'a' and 'b' have been added to the reference numerals of the components that are configured differently in the exemplary embodiments of FIGS. 5 and 6. The description below is substantially limited to these differences compared to the exemplary embodiments of FIGS. 1 to 4, where reference is made to the description of the exemplary embodiments in FIGS. 1 to 4 with respect to same components, features, and functions.

FIG. 5 shows a first alternative embodiment of the conductor part/pin 10. The conductor part/pin 10a of FIG. 5 differs from the conductor part/pin 10 of FIGS. 1 to 4 in the embodiment of the first conductive layer 18a. The first conductive layer 18a has the same base material as the insulating sleeve 16 and thus is fabricated out of PEEK. Different from the insulative PEEK of the insulating sleeve 16, the PEEK of the first conductive layer 18a is a conductive PEEK. Further, the first conductive layer 18a has a thickness T of, for example, between 2 mm and 5 mm. The insulating sleeve 16 and the first conductive layer 18a are connected by an interference fit or interference fit tubing.

A manufacturing sequence of the conductor part 10a is provided.

The insulating sleeve 16 is heated, so that an inner diameter D of the insulating sleeve 16 expands. Thereafter, a tube 38 out of conductive PEEK that represents the first conductive layer 18a is inserted into the expanded diameter D of the insulating sleeve 16 (not shown). The tube 38 has approximately room temperature. Additionally, the tube 38 may be cooled in a pre-cooling step to approximately −40° C. When the hot piece of insulative PEEK of sleeve 16 has cooled down, the expanded diameter D will return to the original diameter and the insulative PEEK of sleeve 16 will be a tight fit onto the conductive PEEK of tube 38, with a good electrical interface. Hence, the cooling down of the heated insulating sleeve 16 results in a fixed connection between the tube 38 and the insulating sleeve 16.

A section 24 of a radially outer surface 26 of the insulating sleeve 16 is equipped by metal plating with a second conductive copper layer 28. A conductive layer may also be provided by spray coating (e.g., plasma spray coating) for the outer conductive layer 28 (not shown). Subsequently, a machined conductive core 14 is inserted in the insulating sleeve 16. The sequence of the last two acts may be reversed.

The plating of the outer surface 26 of the insulating sleeve 16 may be omitted.

FIG. 6 shows a second alternative embodiment of the conductor part/pin 10a. The conductor part/pin 10b of FIG. 6 differs from the conductor part/pin 10a of FIG. 5 in that a radially inner surface 22 of an insulating sleeve 16 has further sections 40, 40', where each includes a further conductive layer 42 configured exemplarily as a metal layer 42. Sections 40, 40' are tapers 66 adjacent to axially ends 68 of section 20, where the further conductive (e.g., metal) layers 42 provide electrical contact to the first conductive layer 18a at section 20 of inner surface 22.

Alternatively and/or additionally, other or further sections may be provided with a conductive layer (e.g., a square or stepped shoulder of the conductive core (not shown)).

Thus, after heat shrinking of the insulating sleeve 16 on the first conductive layer 18a out of conductive PEEK and before the insertion of a conductive core 14 in the insulating sleeve 16, the sections 40, 40' are metal plated.

The term "comprising" does not exclude other elements or steps, and "a" or "an" does not exclude a plurality. Also, elements described in association with different embodiments may be combined.

Although the invention is illustrated and described in detail by the embodiments, the invention is not limited by the examples disclosed. Other variations may be derived therefrom by a person skilled in the art without departing from the scope of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for manufacturing a conductor part for a connector unit, wherein the conductor part comprises a conductive core, an insulating sleeve and at least a first conductive layer arranged between the conductive core and the insulating sleeve, wherein the method comprises:
    equipping at least one section of a radially inner surface of the insulating sleeve with the first conductive layer;
    equipping at least one section of a radially outer surface of the insulating sleeve with at least a second conductive layer, wherein the second conductive layer is a metal plated metal layer, a sprayed metal layer, a vapor deposed metal layer, a sputtered metal layer, or any combination thereof; and
    inserting the conducting core in the insulating sleeve before or after the equipping of the radially inner surface or the radially outer surface of the insulating sleeve with the first conductive layer or the second conductive layer, respectively.

2. The method of claim 1, wherein the equipping of the at least one section of the radially outer surface of the insulating sleeve comprises plating the metal layer onto the at least one section of the radially outer surface of the insulating sleeve, spraying the second conductive layer onto the at least one section of the radially outer surface of the insulating sleeve, or a combination thereof.

3. The method of claim 1, wherein the equipping of the at least one section of the radially inner surface of the insulating sleeve comprises plating the first conductive layer on the at least one section of the radially inner surface of the insulating sleeve, the equipping of the at least one section of the radially inner surface of the insulating sleeve comprises spraying the first conductive layer onto the at least one section of the radially inner surface of the insulating sleeve, the first conductive layer is a metal layer or a conductive plastic layer, or any combination thereof.

4. The method of claim 1, further comprising filling at least a radial space between the conductive core and the first conductive layer at the radially inner surface of the insulating sleeve with at least a mediator layer, wherein the mediator layer has a material of a grease or an adhesive.

5. The method of claim 1, wherein the equipping of the at least one section of the radially inner surface of the insulating sleeve comprises connecting the first conductive layer to the at least one section of the radially inner surface of the insulating sleeve by an interference fit.

6. The method of claim 5, further comprising:

heating the insulating sleeve so that a diameter of the insulating sleeve expands;

inserting a tube out of a conductive material into an expanded diameter of the insulating sleeve;

connecting the insulating sleeve to the tube by cooling down the heated insulating sleeve, thus providing a fixed connection between the tube and the insulating sleeve, wherein the tube represents the first conductive layer.

7. The method of claim 5, further comprising providing another section of the radially inner surface of the insulating sleeve with at least one further conductive layer.

8. The method of claim of claim 7, wherein the at least one further conductive layer is a metal layer.

* * * * *